US011473662B2

(12) United States Patent
Komatsu

(10) Patent No.: US 11,473,662 B2
(45) Date of Patent: Oct. 18, 2022

(54) ELECTROMAGNETIC ACTUATOR WITH DRIVE MEMBER FOR A VEHICLE DRIVELINE COMPONENT

(71) Applicant: GKN Automotive Limited, Birmingham (GB)

(72) Inventor: Toshiaki Komatsu, Commerce Township, MI (US)

(73) Assignee: GKN Automotive Limited, Birmingham (GB)

( * ) Notice: Subject to any disclaimer, the term of this patent is extended or adjusted under 35 U.S.C. 154(b) by 0 days.

(21) Appl. No.: 17/260,489

(22) PCT Filed: Jul. 19, 2018

(86) PCT No.: PCT/US2018/042804
§ 371 (c)(1),
(2) Date: Jan. 14, 2021

(87) PCT Pub. No.: WO2020/018098
PCT Pub. Date: Jan. 23, 2020

(65) Prior Publication Data
US 2021/0317902 A1    Oct. 14, 2021

(51) Int. Cl.
*F16H 48/34* (2012.01)
*F16H 48/08* (2006.01)
*F16H 48/24* (2006.01)

(52) U.S. Cl.
CPC .............. *F16H 48/34* (2013.01); *F16H 48/08* (2013.01); *F16H 48/24* (2013.01); *F16H 2048/346* (2013.01)

(58) Field of Classification Search
CPC ..... F16H 48/24; F16H 48/34; F16H 2048/346
See application file for complete search history.

(56) References Cited

U.S. PATENT DOCUMENTS 7,247,118 B2 *  7/2007  Haruki ................... F16H 48/08
                                                                        335/279
9,422,988 B2 *  8/2016  Beesley ................. F16D 27/02
(Continued)

FOREIGN PATENT DOCUMENTS

JP        2018059606 A  *  4/2018
WO     WO2016035129 A1      3/2016

OTHER PUBLICATIONS

Written Opinion & International Search Report for PCT Application No. PCT/US2018/042804 dated Oct. 30, 2018 (14 pages).

*Primary Examiner* — David R Morris
*Assistant Examiner* — James J Taylor, II
(74) *Attorney, Agent, or Firm* — Jennifer M. Brumbaugh; Reising Ethington P.C.

(57) ABSTRACT

A vehicle differential may have multiple gears and include a coil, a drive member movable in response to a magnetic field generated by the coil, with the drive member being movable between a first position and a second position. The drive member has an axis and includes a first body that is magnetically responsive, a second body coupled to the first body, an axis, an axially forward face and a stop surface axially spaced from the forward face, where the stop surface is arranged to limit movement of the drive member away from the first position. A lock member is engaged and driven by the forward face of the drive member to engage a gear of the differential when the drive member is in the second position, and the lock member is adapted to be disengaged from the gear when the drive member is in the first position.

20 Claims, 6 Drawing Sheets

(56) References Cited

U.S. PATENT DOCUMENTS

| | | |
|---|---|---|
| 10,190,667 B2 * | 1/2019 | Onitake ................. F16H 48/24 |
| 2007/0054771 A1 | 3/2007 | Fusegi |
| 2014/0004988 A1 | 1/2014 | Yamanaka et al. |
| 2017/0297428 A1 | 10/2017 | Inose et al. |

* cited by examiner

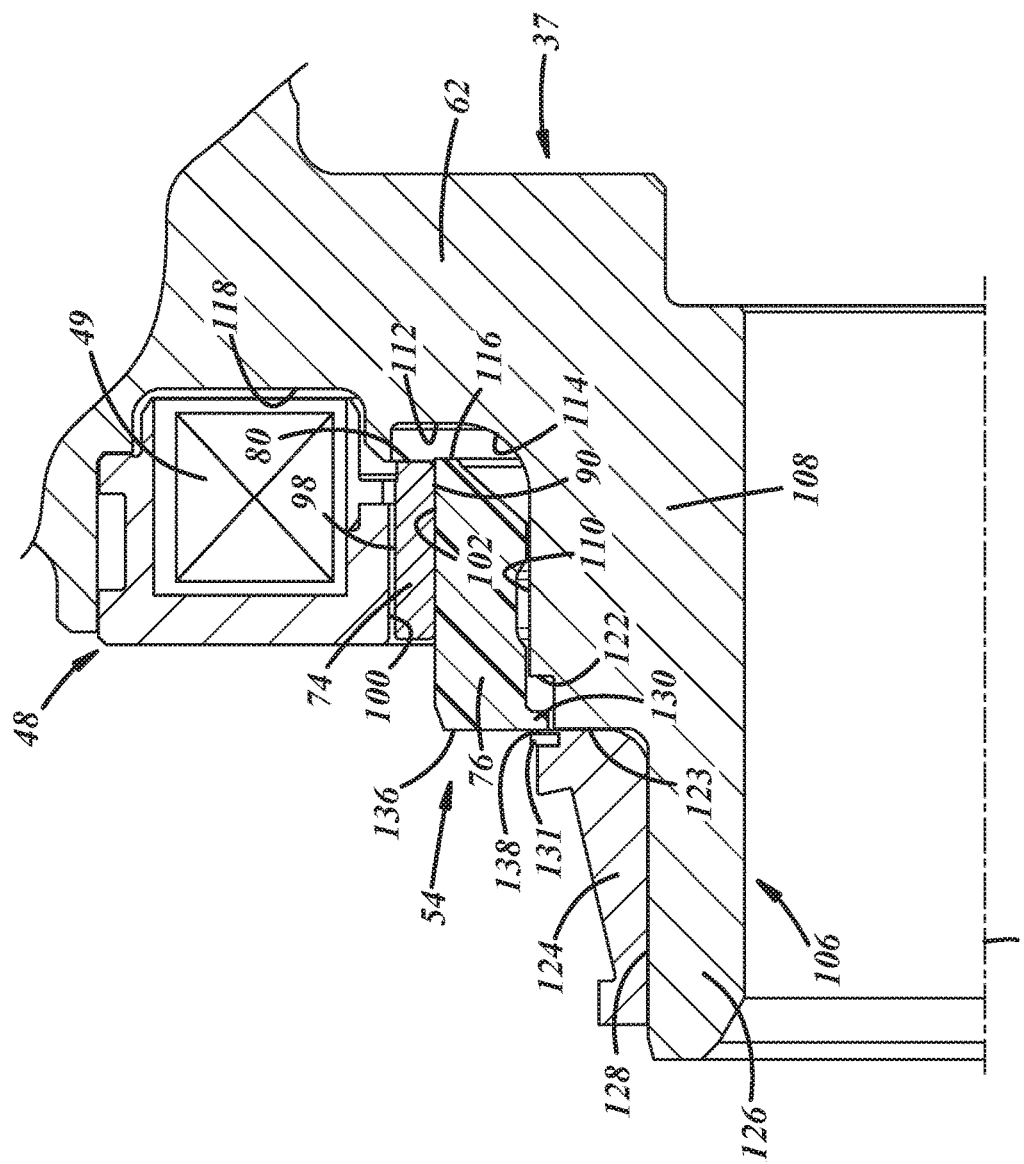
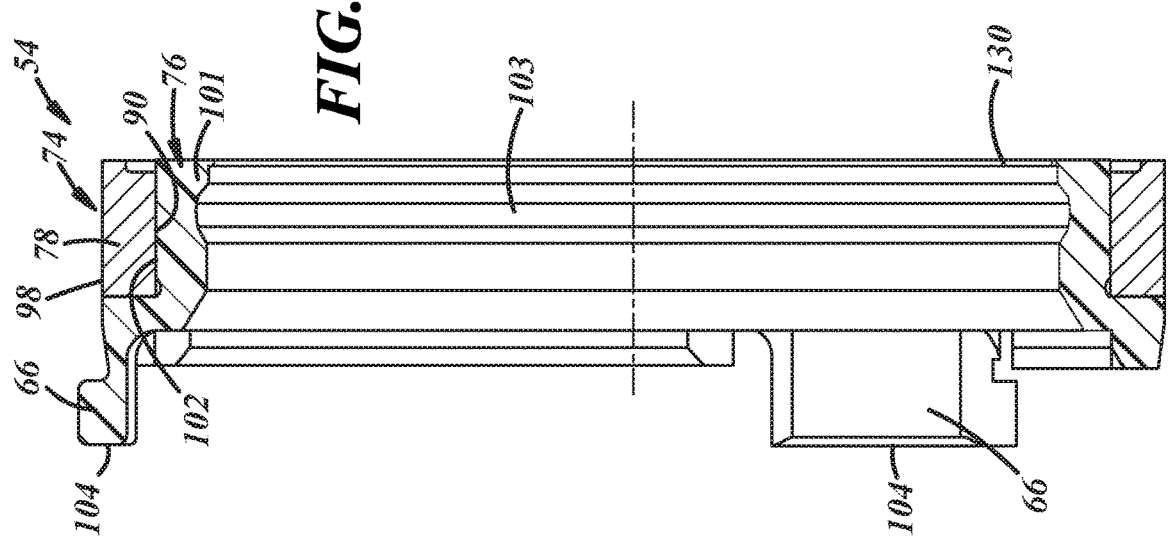
FIG. 4
FIG. 5

ELECTROMAGNETIC ACTUATOR WITH DRIVE MEMBER FOR A VEHICLE DRIVELINE COMPONENT

TECHNICAL FIELD

The present disclosure relates generally to an electromagnetic actuator with a drive member that may be used in vehicle driveline component.

BACKGROUND

During normal operation of a motor vehicle, it is common that all four wheels might not be turning at an identical rate of speed. Different wheel turn rates are most commonly encountered when the vehicle is making a turn, but may also be caused by braking or non-uniform road surface conditions. In order to accommodate differing wheel turning rates while continuing to direct power to two wheels it is possible to provide a differential that allows for different wheel turn rates between the powered wheels. The differential allows the wheels to spin at different rates while delivering power to each wheel. While this solution may be satisfactory in some driving conditions, it is unsatisfactory under conditions where one of the powered wheels experiences a surface having a much lower coefficient of friction than a surface engaged by the other wheel(s). Such conditions may prevent the application of torque to a wheel with more traction, thereby resulting in undesired vehicle performance. A locking mechanism may be provided to lock the differential and prevent different wheel spin rates between two wheels in at least some circumstances.

SUMMARY

A system for a vehicle differential that has multiple gears, includes a coil, a drive member movable in response to a magnetic field generated by application of electricity to the coil, with the drive member being movable between a first position and a second position. The drive member has an axis and includes a first body that is magnetically responsive, a second body coupled to the first body, an axis, an axially forward face and a stop surface axially spaced from the forward face, where the stop surface is arranged to limit movement of the drive member away from the first position. The system may also include a lock member engaged and driven by the forward face of the drive member to engage a gear of the differential when the drive member is in the second position, and the lock member is adapted to be disengaged from the gear when the drive member is in the first position.

In at least some implementations, the first material is a metal and the second body includes a polymer. In at least some implementations, the stop surface defines a radially inward most surface of the drive member. The first body may be located radially outwardly of at least a portion of the second body, and the stop surface may extend radially from the second body. The stop surface may define a radially inward most surface of the second body. The stop surface may be located at an end of the drive member that is axially opposite to the forward face.

In at least some implementations, a vehicle driveline component includes a housing having a radially extending surface, and a tubular portion that has an axis and an axially extending outer surface. A rotary component is carried by the housing, as is a coil radially spaced from the outer surface of the tubular portion. A drive member is at least partially received between the coil and the outer surface of the tubular portion. The drive member is movable in response to a magnetic field generated by application of electricity to the coil between a first position and a second position. The drive member has a first body that is magnetically responsive and a second body coupled to the first body, an axially forward face and a stop surface axially spaced from the forward face, where the stop surface is arranged to limit movement of the drive member away from the first position. A lock member is engaged and driven by the forward face of the drive member to engage the rotary component when the drive member is in the second position and the lock member is adapted to be disengaged from the gear when the drive member is in the first position.

In at least some implementations, the housing includes a mating stop surface engageable by the drive member when the drive member is in the second position. The stop surface may define a radially inward most surface of the drive member. The first body may be located radially outwardly of at least a portion of the second body, and the stop surface may extend radially inwardly from the second body. In at least some implementations, the stop surface is located at an end of the drive member that is axially opposite to the forward face. In at least some implementations, the housing includes a mating stop surface engageable by the drive member when the drive member is in the second position, and the mating stop surface may be defined by a radially smaller portion of the tubular portion. In at least some implementations, the radially smaller portion is defined by a recess or slot formed at an axial end of the tubular portion, and the recess or slot terminates at the mating stop surface. In at least some implementations, a bearing is carried by the housing and the drive member engages the bearing when the drive member is in the first position. In at least some implementations, a selectable shim is positioned between the bearing and the mating stop surface such that the drive member engages the selectable shim, the width of which may be chosen to provide a desired first position of the drive member for a particular application.

In at least some implementations, the forward face of the drive member does not engage the radially extending surface of the housing. In at least some implementations, the housing includes a junction surface that extends between the radially extending surface and the axially extending surface, and the junction surface extends radially at least as far as an outer surface of the second body. In at least some implementations, the junction surface extends radially at least as far as the radial dimension of the forward face of the drive member.

In at least some implementations, a system for a vehicle differential that has multiple gears includes a coil, a drive member and a lock member. The drive member is movable between first and second positions in response to a magnetic field generated by application of electricity to the coil. The drive member includes a first body that is magnetically responsive, and has an axis, an axially forward face and a stop surface axially spaced from the forward face. The stop surface is arranged to limit movement of the drive member away from the first position. The lock member is engaged and driven by the forward face of the drive member to engage a gear of the differential when the drive member is in the second position and the lock member is adapted to be disengaged from the gear when the drive member is in the first position.

In at least some implementations, a housing has a radially extending surface, and a tubular portion that has an axis and an axially extending outer surface around which the drive member is received. The housing may include a mating stop surface engageable by the stop surface of the drive member when the drive member is in the second position.

BRIEF DESCRIPTION OF THE DRAWINGS

The following detailed description of preferred implementations and best mode will be set forth with regard to the accompanying drawings, in which:

FIG. 4 is a sectional view of a portion of the plunger;

FIG. 5 is a fragmentary sectional view of the plunger, actuator and a portion of a housing of the differential;

DETAILED DESCRIPTION

Figure 1:
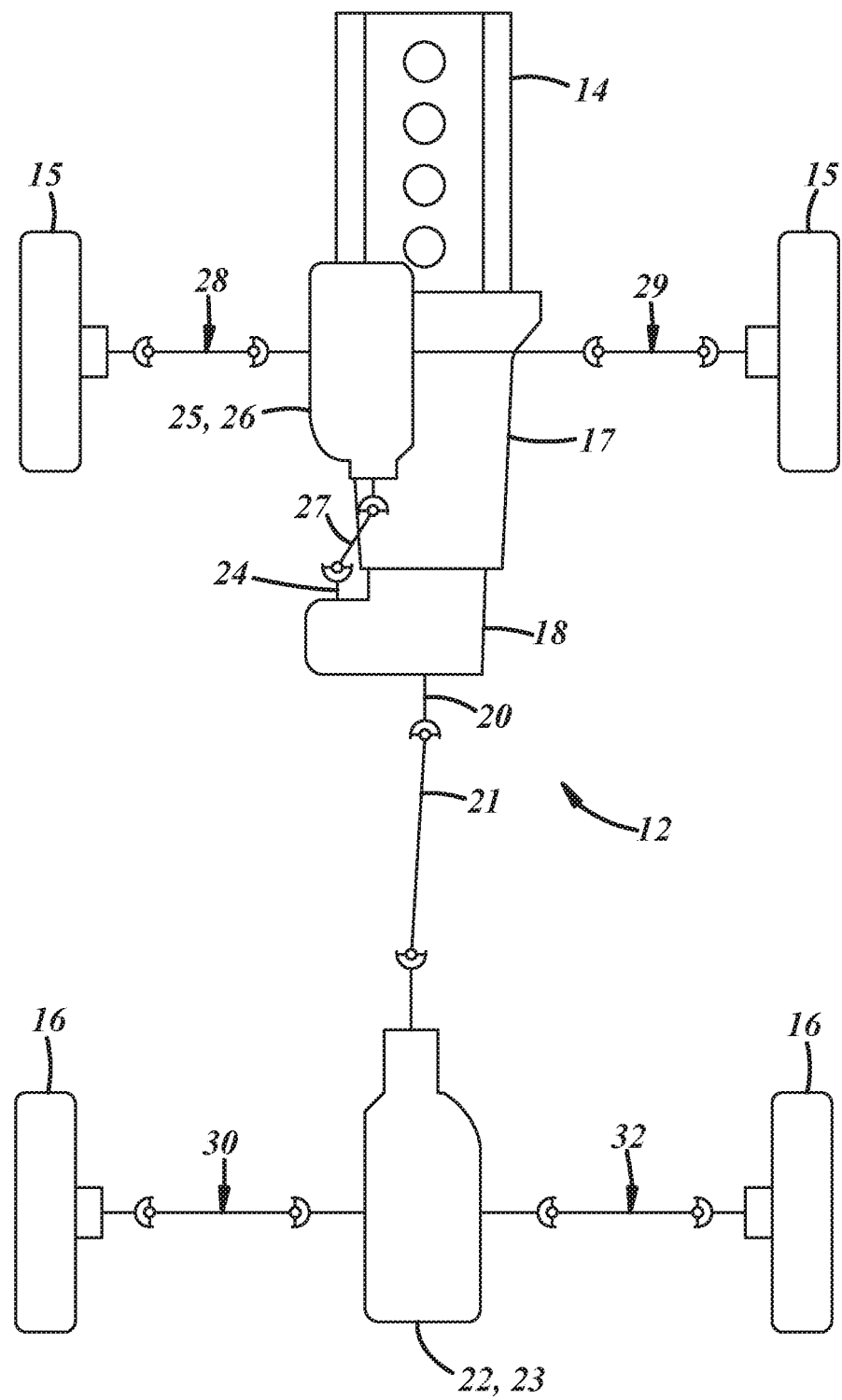
FIG. 1 is a schematic diagram of a vehicle driveline assembly.

Referring in more detail to the drawings, FIG. 1 illustrates a vehicle driveline 12 that provides power from an engine 14 to multiple wheels including front wheels 15 and rear wheels 16. The engine 14 supplies torque via a transmission 17 and a power transfer unit 18 that provides an output shaft 20. The output shaft 20 is coupled to a first prop shaft 21 which is coupled to a rear drive unit 22 that may include a differential assembly 23. The power transfer unit 18 or other device may have an output shaft 24 coupled to a front drive unit 25 (which may include a differential assembly 26) via a second prop shaft 27. Front left and right side shafts 28, 29 are coupled to the drive unit/differential 25, 26 which permits relative rotation between the side shafts 28, 29 and front wheels 15. Rear left and right side shafts 30, 32 are coupled to the rear drive unit/differential 22, 23 which permits relative rotation between the side shafts 30, 32 and rear wheels 16. The power transfer unit 18 may include a disconnect assembly that, when in a connected state, transfers torque to the second prop shaft 27 to drive the front wheels 15. When connected or disconnected, the power transfer unit 18 may provide torque to the first prop shaft 21 to drive the rear wheels 16. Thus, depending upon the state of the disconnect device, the driveline 12 may provide torque to the rear wheels 16 only or to all four of the wheels 15, 16. Of course, other driveline configurations may be used, as desired.

Figure 2:
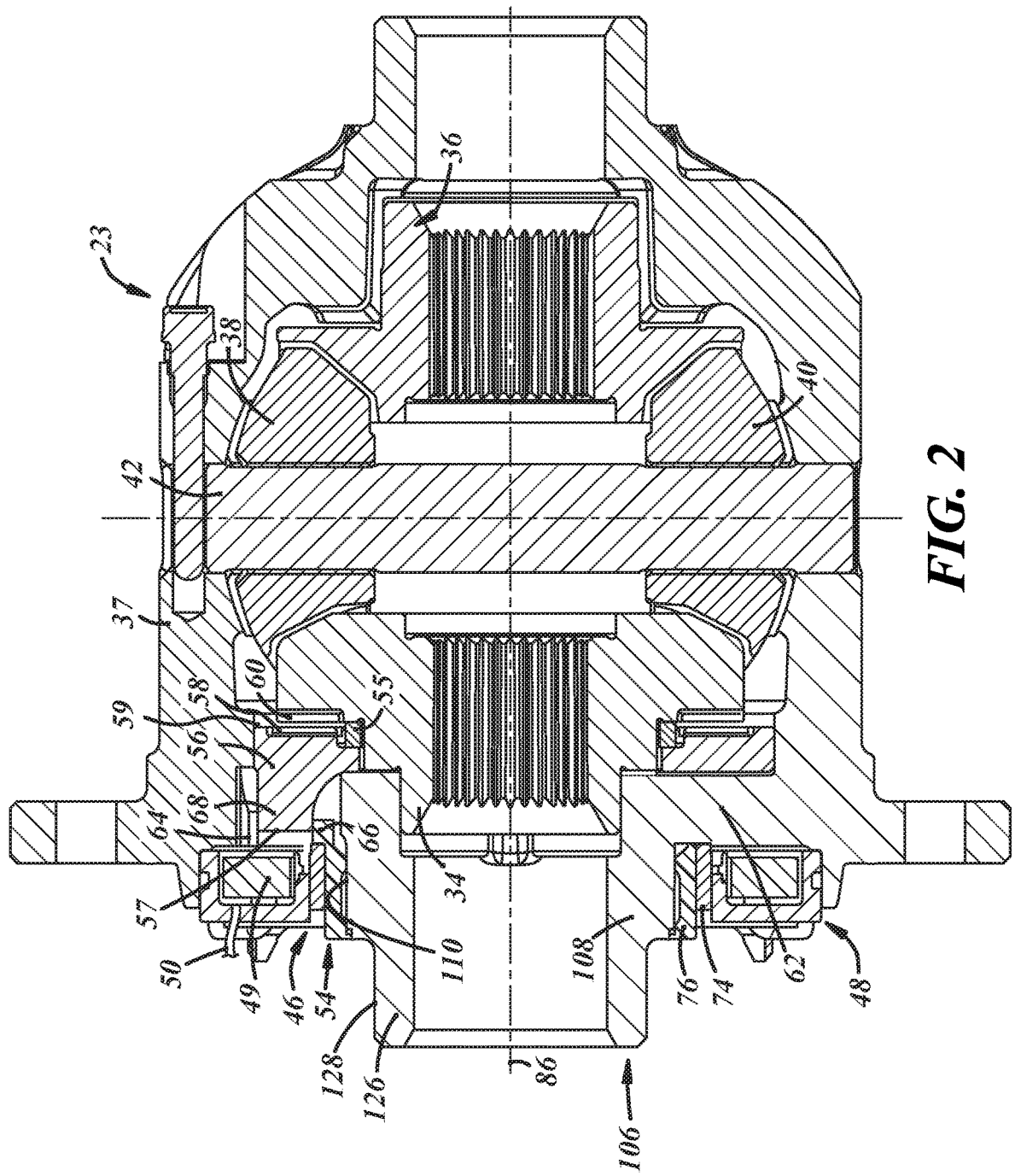
FIG. 2 is a cross-sectional view of a differential with an electrically actuated locking mechanism, wherein the differential is shown in an open position.
Figure 3:
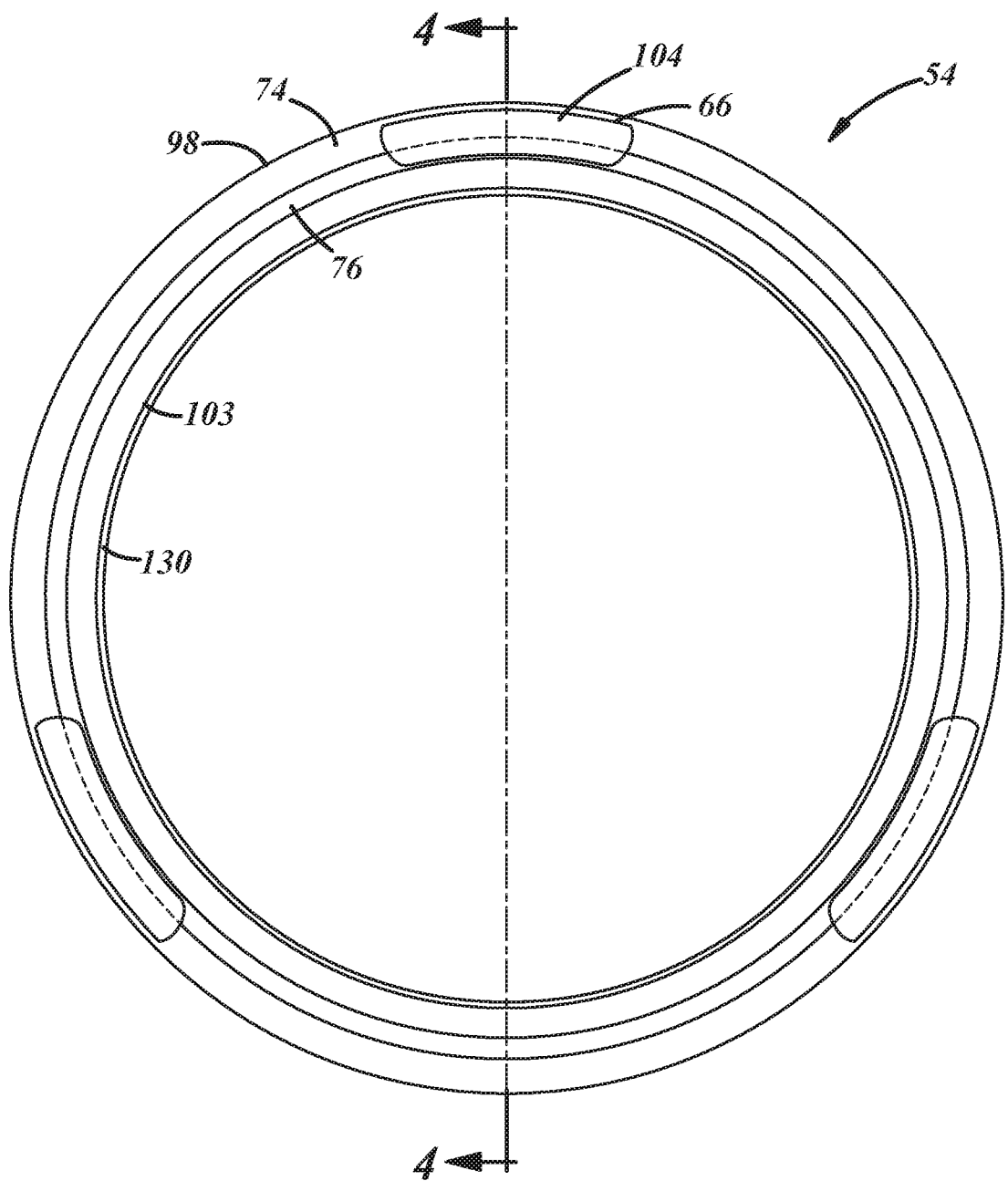
FIG. 3 is a right side view of a plunger of the locking mechanism.

Referring now to FIGS. 1 and 2, the first rear side shaft 30 is connected to a first side gear 34 within the differential 23. Similarly, the second rear side shaft 32 is connected to a second side gear 36 within the differential 23. The side gears 34, 36 are carried within a housing 37 of the differential 23. The differential also includes pinion gears 38, 40 that are meshed with side gears 34, 36, respectively, and which are mounted within the housing 37 on a pinion shaft 42.

To selectively lock and unlock the differential 23 a locking mechanism 46 is provided. The locking mechanism 46 may have actuated and deactuated states, and in one state the locking mechanism couples one of the side shafts (e.g. 32) to the differential housing 37 so that the coupled side shaft rotates with the housing. This, in turn, causes the other side shaft 30 to rotate in unison with the housing 37 and the side shaft 32 coupled to the housing so that both side shafts 30, 32 rotate at the same speed.

In at least some implementations, the locking mechanism 46 is electrically actuated and includes a solenoid 48 having an annular wire coil 49 and a drive member that may include an armature or plunger 54 received at least partially radially inwardly of and axially overlapped with the coil. In at least some implementations, the plunger 54 is also annular, the plunger and coil 49 are coaxially arranged and carried by the housing 37, and one side shaft (here, the second side shaft 32) extends coaxially through a portion of the housing 37 that extends through the coil and plunger. Electric power is supplied to the coil 49 via a power wire 50 to generate a magnetic field that displaces the plunger 54 relative to the coil and differential housing 37 from a first or retracted position to a second or advanced position. To facilitate return of the plunger 54 from the second position back to the first position when power is not provided to the coil 49, a biasing member, such as a spring 55 may act on the plunger 54, or on a component engaged with the plunger, as set forth below. In at least some implementations, the locking mechanism 46 is actuated when the plunger 54 is in the second position and the locking mechanism is deactuated when the plunger is in the first position. While in the example shown the plunger 54 is in its second position when power is provided to the coil 49 and the plunger moves to the first position when power is not supplied to the coil, the opposite could be true if desired (e.g. the locking mechanism 46 could be moved to the actuated position by the biasing member 55 and deactuated by powering the coil).

In at least some implementations, the locking mechanism 46 may further include or be associated with a lock member 56 adapted to be driven by the plunger 54 and to interface with the side gear 34 as set forth below. The lock member 56 may be generally annular and a portion of the second side gear 36 and/or shaft 32 may extend through the lock member. The lock member 56 may include a rear face 57 engageable by the plunger 54 and a front face 59 having at least one engagement feature 58, such as gear or clutch teeth (e.g. dog clutch teeth) configured to engage a corresponding engagement feature 60 (e.g. gear or dog clutch teeth) formed on a rear face of the first side gear 34. The spring 55 may act on the lock member 56 to urge the lock member into the plunger 54 and move the plunger to its first position when the coil 49 is not powered, as noted above. In the implementation shown, the plunger 54 is located adjacent to one side of a housing wall 62 and the lock member 56 is located adjacent to the other side of the wall 62. The wall 62 includes apertures 64, and the plunger 54 and lock member 56 include axially extending feet 66, 68 (e.g. FIG. 2), respectively, that extend into or through the apertures 64 in the wall so that the plunger and lock member are engaged with each other across or through the wall. Like the plunger 54, the lock member 56 also is carried by and rotates with the housing 37.

The differential 23 illustrated in FIG. 2 is shown in an open mode or position. In the illustrated implementation, in the open position of the differential, the coil 49 is not powered, the plunger 54 is in its first position and the lock member 56 is not engaged with the side gear 34 so that the side gear can rotate relative to the lock member 56 and housing 37. In the open position, the side shafts 30, 32 may rotate at different speeds from one another. However, certain driving conditions may make it desirable for the side shafts 30, 32 to rotate in unison such that torque is applied to both wheels.

In the locked position, the coil 49 is powered, the plunger 54 is advanced to its second position which drives the lock member 56 into engagement with the side gear 34 (i.e. teeth 58 engage teeth 60). Hence, the side gear 34 is coupled to the housing 37 so that the side gear rotates with and not relative to the housing. In effect, the second side shaft 32 is locked to and rotates with the housing 37, which in turn forces the first side shaft 30 and the second side shaft 32 to rotate in unison.

As shown in FIGS. 2-7, the plunger 54 may be formed from multiple materials including a material that is magnetically responsive to the magnetic field generated by the coil 49, and at least one other material that may or might not be responsive to the magnetic field. Thus, when the magnetic field is generated by the coil 49, the plunger 54 may be driven from one position to another (e.g. from the retracted to the advanced position). As used herein, a material is responsive to a magnetic field if a magnetic field of the magnitude generated by the solenoid 48 of the type used in applications such as that described herein, may cause a component formed of or including such material to be displaced. In the example set forth herein, the plunger 54 needs to move between the advanced and retracted positions with sufficient force and speed to permit effective operation of the locking mechanism 46. Thus, while all materials may be affected in some way by a magnetic field, especially a field of great strength or magnitude, not all materials are magnetically responsive as that term is used in this disclosure.

For example, iron, nickel and cobalt are often cited as being magnetically responsive as they are relatively strongly affected by magnetic fields. While not limited to steel, one material of the plunger 54 may include various grades of steel which are known to be ferromagnetic and relatively strongly magnetically responsive. Conversely, materials like wood, plastic and glass are often cited as being not magnetically responsive as they are very weakly affected/attracted by magnetic fields. Of course, magnetically responsive materials may be combined with materials that are not magnetically responsive to create a component that is magnetically responsive (e.g. by mixing magnetic materials into a polymeric material).

In at least some implementations, the plunger 54 includes a first body 74 and a second body 76 that are coupled together by one or more attachment features, or by opposed and overlapped surfaces that inhibit or prevent separation of the first body and second body, or both. Non-limiting examples of attachment features include mated projections and voids, where the projections may include flanges, tabs, fingers, tongues and the like, and the voids may include slots, holes, areas adjacent to undercut portions of a body and the like. In at least some implementations, the first body 74 and second body 76 are integrally coupled together so that they move as a single component and are not separated during use. Further, in at least some implementations, the first body 74 and second body 76 may be arranged so that they are not separated without destruction (e.g. cutting or breaking) of a portion of at least one of the bodies.

In the example shown, the first body 74 is annular and formed of a ferromagnetic metal and the second body 76 is annular and formed of a non-ferromagnetic material which may include a polymeric or composite material. As shown, the first body 74 includes a generally cylindrical sidewall 78 that leads to opposed faces 80, 82 and includes a radially facing, and axially and circumferentially extending inner surface 90. A radially facing, and axially and circumferentially extending outer surface 98 of the sidewall 78 may be circumferentially continuous, if desired, and may be arranged for receipt adjacent to a radially inwardly facing surface 100 (FIG. 5) of the solenoid 48. The terms radial, axial and circumferential are relative to a central axis 86 of the first body 74.

Figure 6:
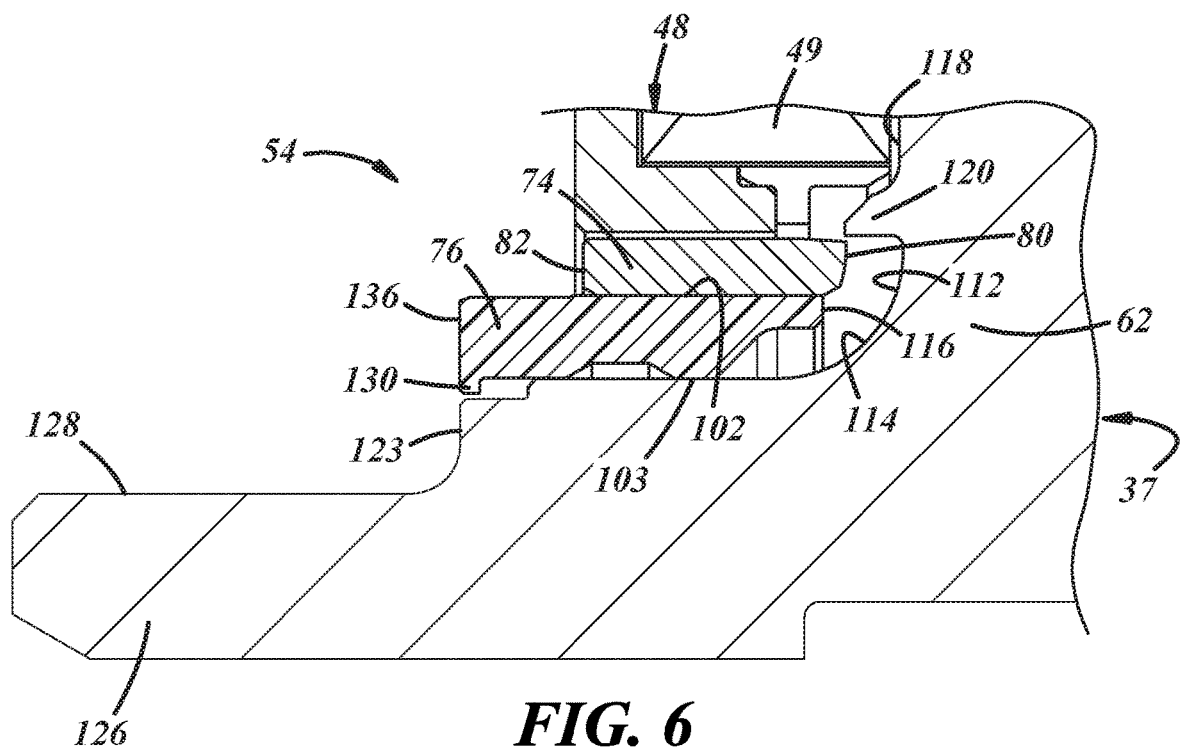
FIG. 6 is an enlarged fragmentary sectional view of the encircled portion 6 in FIG. 5 showing the plunger in a first, retracted position.
Figure 7:
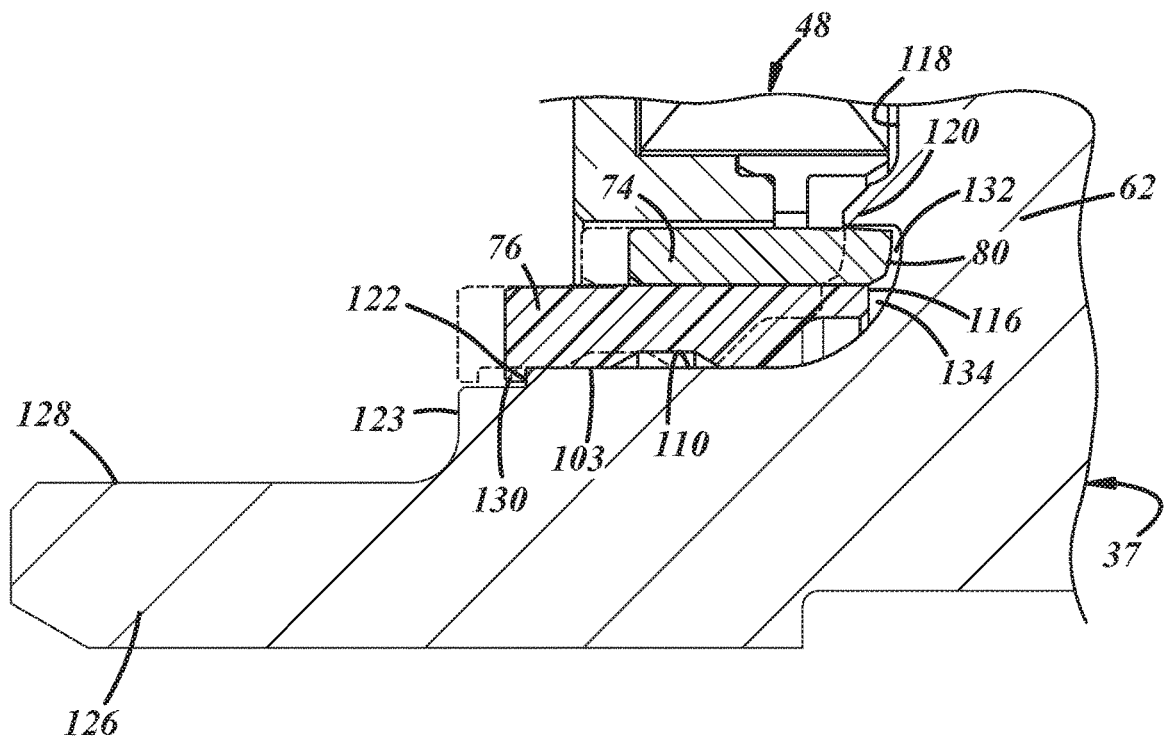
FIG. 7 is a view like FIG. 6 showing the plunger in the second, advanced position.

As shown in FIGS. 6 and 7, the second body 76 may be received at least partially within the first body 74. In the implementation shown, the second body 76 has a sidewall 101 (FIG. 4) at least a portion with an inside diameter that is less than the inside diameter of the first body 74 and an outer surface 102 of at least a portion of the second body 76 is received against the inner surface 90 of the sidewall 78 of the first body 74. An inner surface 103 of sidewall 101 is sized for receipt around an extension 106 of the housing 37 and may be contoured or configured in any desired manner.

The extension 106 of the housing 37 may include a cylindrical and tubular portion of the housing. The tubular portion 108 may receive a side shaft therein and may project axially from the housing wall 62 and have a circumferentially continuous radially outer surface 110 over which the plunger 54 is received. The outer surface 110 may transition or blend with a radially extending surface 112 at a junction surface 114 or trunnion radius. The radially extending surface 112 may be opposed to or face in the opposite direction from the forward face of the plunger (i.e. the forward end 80 or surface of the first body 74 and a forward face 116 of the second body 76). The coil 49 may be located radially outwardly of the plunger 54, and may be received in an annular channel 118 defined in part by a flange 120 at a radially inner surface of the coil.

A mating stop surface 122 may be defined in the tubular portion 108, such as by a recess or slot formed at an axial end 123 of the tubular portion, or by a step formed between two portions of the extension 106 that have different diameters. The recess, slot or step provides or defines a radially smaller portion of the tubular portion 108 and the radially extending mating stop surface 122. A bearing 124 (FIG. 5, wherein only an inner race of the bearing is shown) may be carried by the extension 106, adjacent to the axial end 123 of the tubular portion 108. In the example shown, the bearing 124 is carried by a flange 126 (FIGS. 2 and 5) that extends axially from the tubular portion (or which defines a smaller diameter portion of the tubular portion) and which has an outer surface 128 of a smaller diameter than the tubular portion on which the plunger 54 is received. The bearing 124 may extend radially outwardly beyond the outer surface 110 of the tubular portion 108 and define another stop surface that faces in the opposite direction as the mating stop surface 122 of the tubular portion 108.

In the implementation shown, the second body 76 defines the feet 66 that have an end 104 located axially spaced from the first body 74. As shown, the feet 66 extend axially away from a central body of the plunger 54, and the plunger 54 is oriented in assembly so that the feet 66 extend toward the lock member 56.

To facilitate manufacture and assembly of the plunger 54, the plunger may be formed by an overmolding or insert molding process in which the second body 76 is molded into and/or onto the first body 74. The first body 74 may be fully formed as desired and then inserted into a mold. The second body 76 may then be formed by a suitable molding process (such as but not limited to injection molding) with desired mating or overlapping features provided to couple together the components or at least inhibit removal of the second body 76 from the first body 74 after the plunger 54 is formed. Molding the second body 76 facilitates formation of the radially outwardly and axially extended feet 66 compared to plungers in which the plunger is formed from only metal.

When the plunger is all metal it is typically machined, for example on a lathe, and the geometry of the plunger and the feet are limited by the lathe process and the outer diameter of the feet are not greater than the outer diameter of the plunger sidewall. If the plunger is formed from two metal pieces, the plunger feet on the inner piece must have an outer diameter less than the outer diameter of the outer piece. The smaller inner diameters of the feet require a smaller outer diameter of the adjacent differential housing trunnion to which a shaft is coupled, which can be a weak point in the differential housing. Therefore, the ability to radially outwardly locate the feet 66 as in plunger 54 enables the adjacent portion of the differential housing 37 to be thicker and stronger and also a radius of the junction surface 114 to be larger. This significantly increases the strength of the differential housing 37 and increases the useful life of the differential. Further, if the plunger 54 is formed from two metal pieces they must be coupled together such as by press-fitting, welding and/or staking which can be labor intensive, time consuming and costly processes.

Still further, the second body 76 may include at least one stop surface 130 that may engage the mating stop surface 122 of the tubular portion 108 of the differential housing 37 when the plunger 54 is moved to its advanced position. The stop surface 130, in at least some implementations, extends radially inwardly and has a portion that is radially closer to the axis 86 than the remainder of the inner surface of the second body 76. The stop surface 130 may define a radially inner most portion of the second body 76, and of the plunger 54 generally. Further, the stop surface may be axially spaced from an axially forward face 116 of the second body 76, where the axially forward face 116 may be defined by the end 104 of the feet 66 and by the axially forward face of the second body 76 between adjacent feet 66.

In at least some implementations, the stop surface 130 is located at an end of the drive member 54 that is axially opposite to the forward face 116. The stop surface 130 may engage the mating stop surface 122 defined by one or more of the differential housing 37 (as described above), or by a clip or retaining ring carried by or otherwise coupled to the housing, or a bearing 124 or other component 131 (FIG. 5) received in or coupled to the housing, as desired. The component, such as a ring 131 or shim, that defines the stop surface may have an axial width chosen to provide a desired first position of the plunger 54. In different applications, the axial width of the ring 131 or shim may be different. Such a ring or shim may be chosen to position the plunger 54 relative to the coil to provide a desired response time or a desired movement of the plunger 54. Of course, no shim or ring needs to be used.

The stop surface 130 may be arranged to engage the mating stop surface 122 so that the axially forward face 80 of the first body 74 does not engage the radially extending surface 112 of the differential housing 37. This maintains a gap 132 between the radially extending surface 112 of the housing 37 and the first body 74 which prevents the first body from being magnetically coupled to the housing. A gap 134 may also be maintained between the forward face 116 of the second body 76 (between the feet 66) and the radially extending surface 112 of the housing 37. Multiple stop surfaces 130 may be provided on the second body 76 circumferentially spaced apart, or a single stop surface may be provided and the single surface may extend all or any part of the circumferential extent of the second body 76, as desired. In the example shown, a stop surface 130 is provided extending radially inward from the inner surface 103 and axially inward from the radially rearward face 136 of the second body 76, and the mating stop surface 122 is provided by a radially extending surface of the housing extension. While the stop surface 130 is provided as an integral feature of the second body 76, that is, it may be formed in the same piece of material as the remainder of the second body, the stop surface 130 could be defined by a separate component fixed to or overmolded by the second body. Further, the stop surface 130 may engage a second stop surface 138 (FIG. 5) to limit movement of the plunger 54 away from the advanced position, e.g. to define the retracted position of the plunger. The second stop surface 138, in the example shown, is defined by the ring 131, but it could be defined by the bearing 124 or another structure. Thus, the stop surface 130 engages axially opposite stop surfaces 122 and 138 to limit travel of the plunger 54 to and between its first and second positions (i.e., retracted and advanced positions). The stop surfaces 122 and 138 define a channel in which the stop surface 130 of the second body 76 moves axially between the stop surfaces as the plunger moves between the first and second positions.

In at least some implementations, the gap 132 provides an air space between the differential housing 37 and the face 80 of the first body 74 even when the plunger 54 is fully advanced. Doing so can prevent a continuous or completely closed magnetic circuit from forming between the first body 74 and the differential housing 37. Such a closed circuit may tend to hold the position of the first body 74 (and hence, the plunger 54) relative to the housing 37 even when the plunger 54 is supposed to move toward its retracted position. With the air gap 132 and because the magnetic circuit is not fully closed, the plunger 54 more readily moves from its advanced position toward its retracted position when it is desired to unlock the locking member 56. Other arrangements may be used.

With a plunger 54 that is fully metallic, the gap 132 must be formed by a well-controlled milling process, which can be difficult, time consuming and expensive. The milling process may produce nibs or other small standoffs that provide the gap around at least most of the circumference of the first body. Further, when the two metallic bodies are assembled, care must be taken to ensure that the gap remains during processes such as press-fitting, welding and/or staking, and controlling the part locations and ensuring the gap remains can also be difficult. These difficulties increase the cost to manufacture and assemble a plunger formed from two non-molded bodies. In the examples described above, the forward faces 80, 116 of the first body 74 and second body 76, respectively, do not engage the radially extending surface 112. And when the second body 76 is molded to the first body 74, the stop surface 130 can be integrally formed with the second body 76 to reliably maintain the gap or gaps 132, 134 without requiring precise formation of the forward face of either body 74, 76. Hence, in this way, the gaps 132 are easily and reliably maintained between the plunger 54 and housing 37 without the time consuming and expensive milling or other metal forming process.

Further, because the second body 76 also need not engage the radially extending surface 112 of the housing 37, the radius of the junction surface 114 can be made larger which enables the wall 62 (sometimes called the 'bulkhead') that includes the radially extending surface 112 to be axially thicker and hence, stronger. In at least some implementations, the junction surface 114 may extend radially at least as far as or beyond an outer surface 102 of the second body 76 but less than the outer surface 98 of the first body 74. In at least some implementations, the radius of the junction surface 114 extends radially as far as or beyond the radial thickness of the first body 74 and the second body 76 (i.e. beyond the axially forward face) and the junction surface 114 may fully blend the radially extending surface 112, meaning that the flat portion of the radially extending surface 112 in the area of the plunger 54 is eliminated.

With the second body 76 engaging the housing 37 or other mating stop surface 122 axially spaced from the radially extending wall 112, the first body 74 does not, in at least some implementations, engage the housing or other stop surface at all. As such, the first body 74 does not experience any impact or direct loading so the connection between the first body 74 and second body 76 does not need to withstand such loading or force. Accordingly, heat staking, welding, adhesive or other fasteners like screws, clips or bolts are not needed between the first body 74 and the second body 76 in at least some implementations, further reducing the time and cost to manufacture and assembly the plunger 54.

Figure 8:
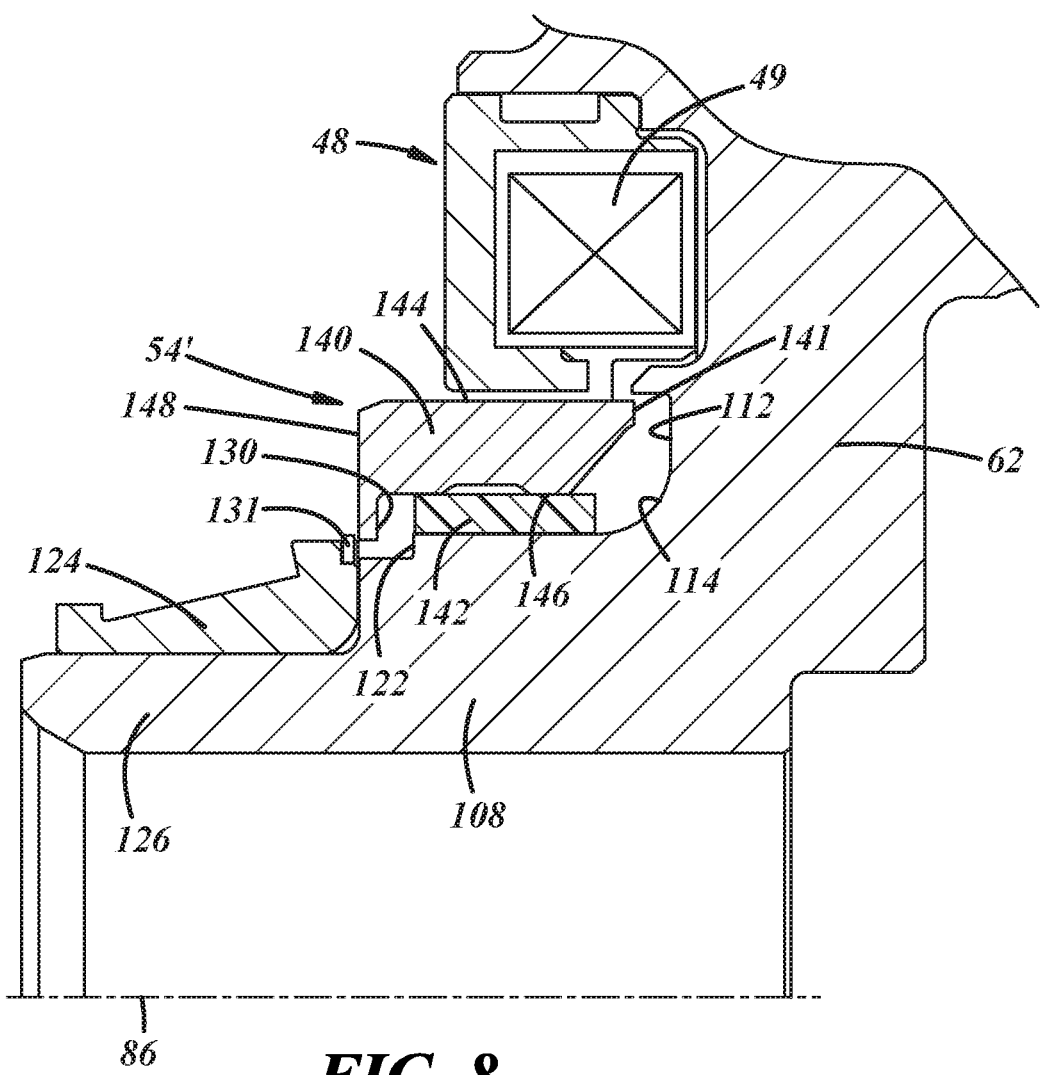
FIG. 8 is a fragmentary sectional view of a plunger, actuator and a portion of a housing of the differential, showing a plunger formed from a single body.

As shown in FIG. 8, the drive member or plunger 54' may be defined by a single body 140, rather than two separate bodies 74, 76 as shown in the other embodiments. The single body 140 may be magnetically responsive and may include all of the features of the previously described plunger 54, including the stop surface 130, and an axially forward face 141 that is maintained separate from an adjacent housing surface (e.g. the radially extending surface 112 or junction surface 114) to provide a gap between them in the second position of the plunger 54', an axially extending radial outer surface 144, an axially extending radially inner surface 146, and a radially extending rear surface 148. In at least some implementations, a non-magnetically responsive sleeve 142 is positioned radially between the plunger 54' and the tubular portion 108, to prevent magnetic attraction between the plunger 54' and housing 37 and/or to provide a desired sliding surface for the plunger (e.g. a reduced friction sliding surface).

It is to be understood that the above description is intended to be illustrative and not restrictive. Many embodiments and applications other than the examples provided would be apparent upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their broadest reasonable constructions and their ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary. In the preceding description, various operating parameters and components are described for one or more exemplary embodiments. These specific parameters and components are included as examples and are not meant to be limiting.

Reference in the preceding description to "one example," "an example," "one embodiment," "an embodiment", "an implementation" or "at least some implementations" means that a particular feature, structure, or characteristic described in connection with the example is included in at least one example or implementation including one or more but not necessarily all innovative features or components.

References to various examples, embodiments or implementations do not necessarily refer to the same example, embodiment or implementation each time it appears.

The invention claimed is:

1. A system for a vehicle differential that has multiple gears, the system comprising:
   a coil;
   a drive member movable in response to a magnetic field generated by application of electricity to the coil, the drive member being movable between a first position and a second position, the drive member including a first body that is magnetically responsive and a second body coupled to the first body, the drive member having a rotational axis, an axially forward face and a stop surface axially spaced from the forward face, the stop surface being arranged to limit movement of the drive member away from the first position; and
   a lock member engaged and driven by the forward face of the drive member to engage a gear of the vehicle differential when the drive member is in the second position and the lock member is adapted to be disengaged from the gear when the drive member is in the first position, wherein the drive member includes an inner surface radially spaced from the rotational axis and adapted to slide over an axially extending surface of a housing of the differential, and the stop surface extends radially closer to the rotational axis than the inner surface.

2. The system of claim 1 wherein the second body is not magnetically responsive.

3. The system of claim 2 wherein the stop surface extends radially to a radially inward most surface of the second body.

4. The system of claim 1 wherein the stop surface extends radially to a radially inward most surface of the drive member.

5. The system of claim 4 wherein the first body is located radially outwardly of at least a portion of the second body, and wherein the stop surface extends radially from the second body.

6. The system of claim 1 wherein the stop surface of the drive member includes a first portion facing in a first axial direction and a second portion facing in a second, axially opposite direction.

7. A vehicle driveline component, comprising:
   a housing having a radially extending surface, and a tubular portion that has a rotational axis and an axially extending outer surface;
   a rotary component carried by the housing;
   a coil carried by the housing radially spaced from the outer surface of the tubular portion;
   a drive member at least partially received between the coil and the outer surface of the tubular portion, the drive member being movable in response to a magnetic field generated by application of electricity to the coil, the drive member being movable between a first position and a second position, the drive member having a first body that is magnetically responsive and a second body coupled to the first body, the drive member having an axially forward face and a stop surface axially spaced from the forward face; and a lock member engaged and driven by the forward face of the drive member to engage the rotary component when the drive member is in the second position and the lock member is adapted to be disengaged from the rotary component when the drive member is in the first position wherein the drive member includes an inner surface slidably engaged with and movable along the axially extending outer surface, and the stop surface: a) extends radially closer to the rotational axis than the inner surface; or b) the inner surface is located axially between the forward face and the stop surface; or c) both (a) and (b).

8. The vehicle driveline component of claim 7 wherein the stop surface is arranged to contact a first mating stop surface of the housing or other component of the vehicle driveline component when the drive member is in the second position and is arranged to contact a second mating stop surface when the drive member is in the first position, wherein the second mating stop surface is defined by a shim or by another component of the vehicle driveline component received in or carried by the housing, and the first mating stop surface and second mating stop surface define at least part of a channel in which the stop surface of the drive member is received.

9. The vehicle driveline component of claim 8 wherein the housing includes the first mating stop surface engageable by the stop surface of the drive member when the drive member is in the second position, and wherein the first mating stop surface is a surface of the tubular portion that extends radially inwardly from the axially extending outer surface.

10. The vehicle driveline component of claim 9 wherein a radially smaller portion is defined by a recess or slot formed at an axial end of the tubular portion, the recess or slot terminates at the first mating stop surface.

11. The vehicle driveline component of claim 7 wherein the stop surface defines a radially inward most surface of the drive member.

12. The vehicle driveline component of claim 7 wherein the first body is located radially outwardly of at least a portion of the second body, and wherein the stop surface extends radially inwardly from the second body.

13. The vehicle driveline component of claim 7 wherein the stop surface of the drive member includes a first portion facing in a first axial direction and a second portion facing in a second, axially opposite direction.

14. The vehicle driveline component of claim 7 wherein the forward face of the drive member does not engage the radially extending surface of the housing when the drive member is in the second position.

15. The vehicle driveline component of claim 7 wherein the housing includes a junction surface that extends between the radially extending surface and the axially extending outer surface, and the junction surface extends radially at least as far as an outer surface of the second body.

16. The vehicle driveline component of claim 15 wherein the junction surface extends radially at least as far as a radial dimension of the forward face of the drive member.

17. The vehicle driveline component of claim 7 which also includes a bearing carried by the housing and wherein the bearing defines a second mating stop surface.

18. The vehicle driveline component of claim 7 which also includes a bearing and a shim positioned such that the drive member engages the shim.

19. A system for a vehicle differential that has multiple gears, the system comprising:
a coil;
a drive member movable in response to a magnetic field generated by application of electricity to the coil, the drive member being movable between a first position and a second position, the drive member including a first body that is magnetically responsive, the drive member having a rotational axis, an axially forward face and a stop surface axially spaced from the forward face; and
a lock member engaged and driven by the forward face of the drive member to engage a gear of the vehicle differential when the drive member is in the second position and the lock member is adapted to be disengaged from the gear when the drive member is in the first position wherein the drive member includes an inner surface adapted to be received over and slidably movable along an axially extending outer surface of a housing of the differential, and the stop surface: a) extends radially closer to the rotational axis than the inner surface; or b) the inner surface is located axially between the forward face and the stop surface; or c) both (a) and (b).

20. The system of claim 19 which also includes the housing having a radially extending surface, and a tubular portion that has an axis and the axially extending outer surface around which the drive member is received, and wherein the housing includes a first mating stop surface engageable by the stop surface of the drive member when the drive member is in the second position, and wherein the first mating stop surface extends radially inwardly from the axially extending outer surface.

* * * * *